July 23, 1929.  J. HEKTNER  1,722,143
BEARING REMOVING PROCESS
Filed Jan. 5, 1928
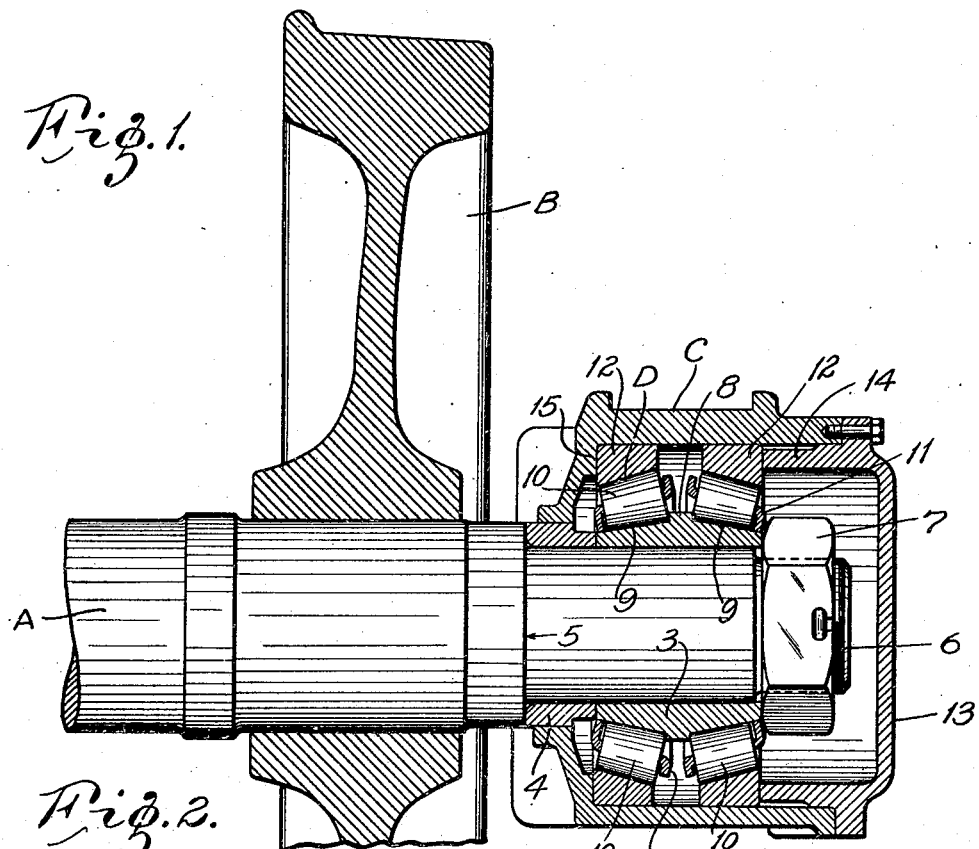
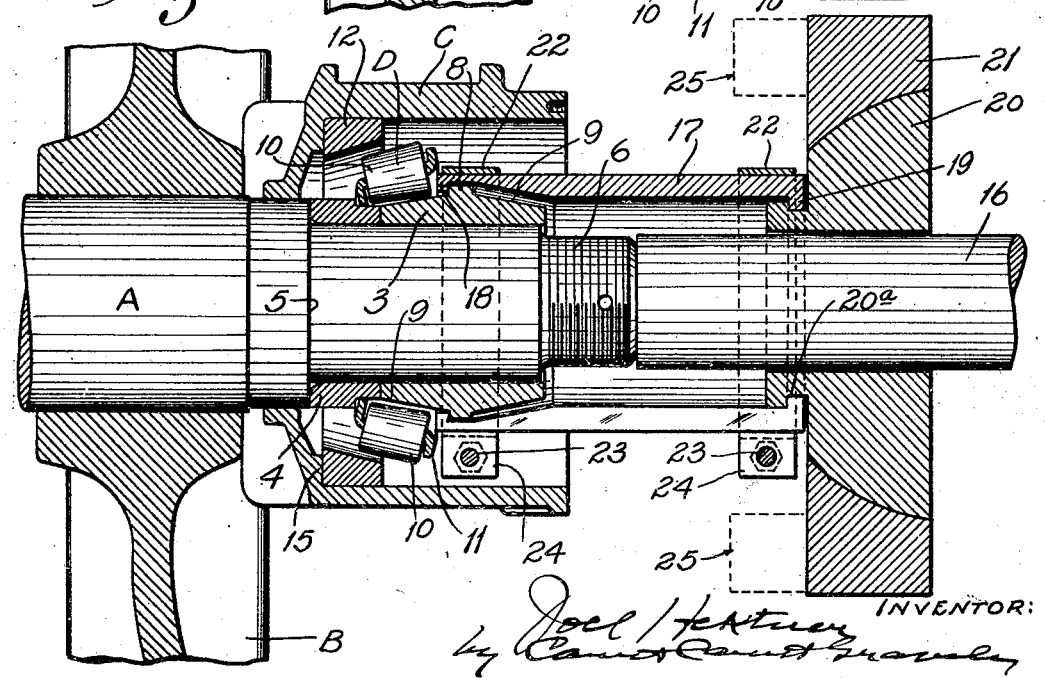
INVENTOR:
Joel Hektner
HIS ATTORNEYS.

Patented July 23, 1929.

1,722,143

UNITED STATES PATENT OFFICE.

JOEL HEKTNER, OF CANTON, OHIO, ASSIGNOR TO THE TIMKEN ROLLER BEARING COMPANY, OF CANTON, OHIO, A CORPORATION OF OHIO.

BEARING-REMOVING PROCESS.

Application filed January 5, 1928. Serial No. 244,574.

This invention relates to roller bearing axle constructions of the type wherein the end portion of the axle is encased in a housing and the roller bearing is interposed between said housing and said axle with its inner raceway member press-fitted on the axle. The principal object of the present invention is to devise a practical and economical process of removing the inner raceway member from the axle. The invention consists in the process hereinafter described.

In the accompanying drawing, which forms part of this specification and wherein like symbols refer to like parts wherever they occur, Fig. 1 is a longitudinal sectional view of the end portion of a roller bearing axle construction provided with an inner raceway member adapted for removal according to my process; and Fig. 2 is a similar view of the axle construction with parts removed to permit the end of the axle to be engaged by the ram of the press and the rib of the inner raceway member to be engaged by the pulling mechanism of said press.

The roller bearing axle construction illustrated in the accompanying drawing comprises a solid axle A with a wheel B pressed thereon near its end and with the portion of the axle located outwardly from said wheel extending into the cylindrical chamber of a housing or journal box C through a circular opening in the inner wall thereof. The end portion of the axle A is of reduced diameter and is rotatably supported in the journal box C by means of double cone roller bearing D interposed between said axle and journal box.

As shown in the drawing, the roller bearing D comprises a tubular inner raceway member 3 press-fitted on the reduced end portion of the axle with its inner end abutting against the outer end of a spacing sleeve or collar 4, whose inner end abuts against the shoulder 5 formed by the reduced portion of said axle. The axle terminates beyond the inner raceway member 3 in a reduced portion 6 which is threaded to receive a nut 7 which bears against the outer end of said member and thus serves to hold the same on the axle in abutting relation to the spacing sleeve or collar 4. The inner raceway member 3 has a circumferential thrust rib 8 located about midway of its length and two conical bearing surfaces 9 that taper from said rib towards the respective ends of said inner raceway member. Cooperating with the bearing surfaces 9 of the doubly conical bearing member are circular series of conical antifriction rollers 10 that are assembled in suitable cages 11 and cooperate with conical cups or outer raceway members 12 seated within the cylindrical chamber in the housing or journal box C which encases the end portion of the axle A. The bearing box C serves as a reservoir for lubricant and has its outer end closed by an end closure cap or cover 13 which is bolted or otherwise removably secured to the outer end of said journal box and has an inwardly extending annular flange 14 adapted to fit within the cylindrical chamber in the journal box and abut against the outer end of the two cups or raceway members 12 of the bearing D. The inner of the two cups or raceway members 12 seats against an annular shoulder 15 formed in the inner wall of the journal box.

With the above arrangement, when it is desired to remove the inner raceway member 3 from the end of the axle, the end cover 13, the adjusting nuts 7, the outer of the two bearing cups 12 and the outer of the bearing cages 11, together with bearing rollers 10 assembled therein, are first removed from the end of the axle construction in the order named. The axle construction is then placed in a suitable press with the end of the axle A in position to be engaged by the ram 16 of the press. The journal box C with the inner of the two bearing cups 12 therein, is then slid inwardly along the axle a distance sufficient to permit the inner cage and the series of bearing rollers mounted therein to be also slid inwardly along the bearing cone 3 far enough to provide a space between the circumferential rib 8 on said cone and the inner ends of said bearing rollers, thereby adapting said rib to be engaged by a pulling implement 17 suitable for removing it from the axle.

As shown in Fig. 2, the pulling implement 17 is made in the form of a split sleeve, which surrounds the abutting ends of the axle A and ram 16 and the outer portion of the bearing cone 3 and is provided at its inner end with an inwardly extending rib or flange 18 that hooks over the rib 8 of said cone. The outer end of the tube is also preferably provided with an inwardly extending rib or flange 19, which seats within an external groove 20ª in a ball plate 20, which is provided with a central bore in which the ram 16 reciprocates and has a ball and socket connection with a socket plate 21. As shown in the drawing, the segmental pulling tube is clamped to the bearing cone 3 and to the ball plate 20 by means of split clamping bands 22, which encircle the tube adjacent to the ends thereof and are drawn tight thereon by means of clamping bolts 23 which extend through the radially projecting ends 24 of said bands.

With the parts positioned in the press as shown in Fig. 2, the stops, such as the parallels 25 of the press, are positioned against the socket plate 21 and the ram 16 is made to bear axially against the end of the axle A and thereby presses the axle through the cone 3, which is held against movement with said axle by means of the pulling tube 17. When the cone is removed, the inner series of rollers, and the journal box with the inner bearing cup may be readily removed. If desired, the cone may be stripped from the end of the axle by using the ram as a stop for the axle and by moving the socket plate away from the end of the axle.

While the foregoing description is particularly applicable to roller bearing axle constructions of the type illustrated, it is also applicable to other constructions; and, of course, some other pulling arrangement may be used instead of the arrangement shown.

What I claim is:

1. The process of removing an antifriction bearing from an axle construction wherein the end portion of the axle is enclosed in a housing and the roller bearing is interposed between said axle and said housing and comprises an outer raceway member mounted in said housing, a ribbed inner raceway member mounted on said axle and anti-friction members disposed between said raceway members, which consists in removing the outer raceway member and the anti-friction members cooperating therewith, hooking a pulling implement over the rib of said inner raceway member, and then causing relative movement between said pulling implement and said axle longitudinally of the latter to remove said inner raceway member therefrom.

2. The process of removing an antifriction bearing from an axle construction wherein the end portion of the axle is enclosed in a housing and the roller bearing is interposed between said axle and said housing and comprises an outer raceway member mounted in said housing, a ribbed inner raceway member mounted on said axle and anti-friction members disposed between said raceway members, which consists in removing the outer raceway member and the anti-friction members cooperating therewith, engaging the inner face of the rib of said inner raceway member with an implement suitable for preventing inward movement thereof, and then pressing said axle through said inner raceway member.

3. The process of removing a roller bearing from an axle construction wherein the end portion of the axle is enclosed in a housing and the roller bearing is interposed between said axle and said housing and includes a circumferentially ribbed inner raceway member press-fitted on said axle and bearing rollers cooperating with said inner raceway member, which consists in removing the bearing rollers, engaging the inner face of the circumferential rib of said raceway member with a pulling implement, and then causing relative movement between said pulling implement and said axle longitudinally of the latter to remove the inner raceway member therefrom.

4. The process of removing a roller bearing from an axle construction wherein the end portion of the axle is enclosed in a housing and the roller bearing is interposed between said axle and said housing and comprises a circumferentially ribbed inner raceway member press-fitted on said axle and bearing rollers cooperating with said inner raceway member, which consists in removing the bearing rollers, engaging inner edge of the circumferential rib of the inner raceway member with an implement suitable for preventing inward movement thereof, and then pressing said axle through said inner raceway member.

5. The process of removing a roller bearing from an axle construction wherein the end of the axle is enclosed in a housing and the roller bearing is interposed between said housing and said axle and comprises a conical cup mounted in said housing, a cone press-fitted on said axle and having a circumferential thrust rib, and conical bearing rollers interposed between said cup and said cone, which consists in removing the cup and the bearing rollers, engaging the inner edge of the rib of said cone with a suitable pulling implement, and then causing relative movement between said pulling implement and said axle longitudinally of the latter to strip the cone therefrom.

6. The process of removing a conical roller bearing from an axle construction wherein the end portion of the axle is enclosed in a housing and the roller bearing is interposed between said housing and said axle and comprises a conical cup mounted in said housing, a cone mounted on said axle and having a circumferential rib, and conical bearing rollers interposed between said cup and said cone, which consists in removing the cup and the bearing rollers, engaging the inner edge of the rib of said cone with an implement adapted to prevent inward movement thereof, and then pressing the end of said axle through said cone.

7. The process of removing a roller bearing from an axle construction wherein the end portion of the axle is enclosed in a housing and the roller bearing is interposed between the axle and the housing and comprises an inner bearing member mounted on said axle and having raceways separated by a circumferential thrust rib, series of antifriction members for the raceways of said inner bearing member, and outer raceway members for the series of antifriction bearings mounted in said housing, which consists in removing the endmost outer raceway member and the endmost series of antifriction members, engaging said rib with a suitable pulling implement, and then causing relative movement between said pulling implement and said axle endwise of the latter to remove the inner raceway member therefrom.

8. The process of removing a roller bearing from an axle construction wherein the end portion of the axle is enclosed in a housing and the roller bearing is interposed between the axle and the housing and comprises an inner bearing member mounted on said axle and having raceways separated by a circumferential thrust rib, series of antifriction members for the raceways of said inner bearing member, and outer raceway members for the series of antifriction bearings mounted in said housing, which consists in removing the endmost outer raceway member and the endmost series of antifriction members, sliding the housing together with the remaining outer raceway member and the remaining series of antifriction members inward on said axle far enough to permit the rib of the inner raceway member to be engaged by a pulling implement, and then causing relative movement between said pulling implement and said axle endwise of the latter to remove the inner raceway member therefrom.

9. The process of removing a roller bearing from an axle construction wherein the end portion of the axle is enclosed in a housing and the roller bearing is interposed between the axle and the housing and comprises a double cone mounted on said axle and having conical raceways separated by circumferential thrust rib, series of conical bearing rollers for the conical raceways of said cones and conical cups mounted in said housing and cooperating with said series of rollers, which consists in moving the endmost cup and the endmost series of rollers, sliding the housing together with the remaining cups and the remaining series of rollers inward on said axle far enough to permit the rib of the cone to be engaged by a pulling implement, and then causing relative movement between said pulling implement and said axle endwise of the latter to remove the cone therefrom.

Signed at Canton, Ohio, this 29th day of December 1927.

JOEL HEKTNER.